United States Patent
Jung et al.

(10) Patent No.: US 12,443,437 B2
(45) Date of Patent: Oct. 14, 2025

(54) INFORMED OPTIMIZATION OF THREAD GROUP SCHEDULING

(71) Applicant: Dell Products L.P., Hopkinton, MA (US)

(72) Inventors: Jaeyoo Jung, Shrewsbury, MA (US); Peter Linden, Boston, MA (US); Robert Lucey, Whitechurch (IE); Wednesday Wolf, Brookline, MA (US)

(73) Assignee: Dell Products L.P., Hopkinton, MA (US)

( * ) Notice: Subject to any disclaimer, the term of this patent is extended or adjusted under 35 U.S.C. 154(b) by 467 days.

(21) Appl. No.: 17/709,519

(22) Filed: Mar. 31, 2022

(65) Prior Publication Data
US 2023/0315518 A1    Oct. 5, 2023

(51) Int. Cl.
G06F 3/00    (2006.01)
G06F 9/48    (2006.01)
G06F 9/50    (2006.01)

(52) U.S. Cl.
CPC .......... G06F 9/4881 (2013.01); G06F 9/5038 (2013.01)

(58) Field of Classification Search
CPC ........................................................ G06F 9/48
See application file for complete search history.

(56) References Cited

U.S. PATENT DOCUMENTS

| | | | | |
|---|---|---|---|---|
| 4,510,565 A * | 4/1985 | Dummermuth | .... | G05B 19/4147 700/169 |
| 9,654,442 B2 * | 5/2017 | Tung | .... | H04L 41/0806 |
| 10,880,204 B1 * | 12/2020 | Shalev | .... | H04L 47/365 |
| 10,963,189 B1 * | 3/2021 | Neelakantam | ...... | G06F 3/0656 |
| 2003/0204552 A1 * | 10/2003 | Zuberi | .... | H04L 69/12 718/103 |
| 2006/0212840 A1 * | 9/2006 | Kumamoto | .... | G06F 9/461 717/100 |
| 2011/0283286 A1 * | 11/2011 | Wu | .... | G06F 1/329 718/103 |
| 2012/0284718 A1 * | 11/2012 | Dahlstedt | .... | G06F 9/45533 718/1 |
| 2016/0077948 A1 * | 3/2016 | Goel | .... | G06F 11/328 714/47.1 |
| 2016/0092108 A1 * | 3/2016 | Karaje | .... | G06F 3/067 718/103 |
| 2016/0132214 A1 * | 5/2016 | Koushik | .... | G06F 8/61 715/741 |

(Continued)

OTHER PUBLICATIONS

Uiseok Song, Optimizing communication performance in scale-out storage system. (Year: 2019).*

(Continued)

*Primary Examiner* — Lechi Truong
(74) *Attorney, Agent, or Firm* — Anderson Gorecki LLP

(57) ABSTRACT

Individual processors of a storage system are analyzed to determine which thread types are most important for servicing a run workload, where importance is measured by number of CPU cycles used. Permutations of differentiated access to CPU cycles are calculated, where the most important thread types are provided with greater access to CPU cycles than thread types of lesser importance. The permutations are tested with the same run workload to determine which permutation yields the greatest average IOPS. The thread scheduler for the processor is configured with that permutation.

11 Claims, 5 Drawing Sheets

(56) References Cited

U.S. PATENT DOCUMENTS

| | | | |
|---|---|---|---|
| 2017/0109251 A1* | 4/2017 | Das | G06F 9/45558 |
| 2019/0004710 A1* | 1/2019 | Ebsen | G06F 3/0679 |
| 2021/0034419 A1* | 2/2021 | Krasner | G06N 20/00 |
| 2021/0064430 A1* | 3/2021 | Srivastava | G06F 3/0659 |
| 2021/0311852 A1* | 10/2021 | Doddaiah | G06F 11/3485 |
| 2022/0100573 A1* | 3/2022 | Allen | G06F 9/5038 |
| 2023/0168934 A1* | 6/2023 | Vaka | H04L 67/1097 718/104 |
| 2023/0315518 A1* | 10/2023 | Jung | G06F 9/4881 718/104 |

OTHER PUBLICATIONS

R. Andersen, Harvesting Idle Windows CPU Cycles for Grid Computing. (Year: 2006).*
Anastasios Papagiannis, Memory-Mapped I/O on Steroids. (Year: 2021).*
Junjie Qian, Energy-efficient I/O Thread Schedulers for NVMe SSDs on NUMA. (Year: 2017).*
Jeffery A. Brown, The Shared-Thread Multiprocessor. (Year: 2008).*

* cited by examiner

INFORMED OPTIMIZATION OF THREAD GROUP SCHEDULING

TECHNICAL FIELD

The subject matter of this disclosure is generally related to configuring a data storage system such as a storage array to improve or optimize performance in terms of input-output operations per second (IOPS).

BACKGROUND

High-capacity data storage systems such as storage area networks (SANs), network-attached storage (NAS), and storage arrays are used to maintain storage objects that may be contemporaneously accessed by multiple host servers. Such storage systems include compute nodes that manage access to data maintained on arrays of non-volatile drives. The compute nodes respond to input-output (IO) commands from host applications that run on the host servers. Examples of host applications may include, but are not limited to, software for email, accounting, manufacturing, inventory control, and a wide variety of other business processes. Storage system performance is typically expressed in terms of the average number of IO commands per second (IOPS) that can be serviced, which is a function of the average time between receiving an IO command and either returning data in the case of a read or returning an acknowledgment in the case of a write. A wide variety of factors influence IO processing latency.

SUMMARY

The presently disclosed invention is predicated in part on recognition that operation of certain types of threads have greater influence on storage system performance than other types of threads and the relative influence of thread type on storage system performance can vary for individual processors based on a variety of factors including workload profile variation. Moreover, per-processor performance, and thus storage system performance, may be improved or optimized by determining which types of threads are most important for servicing a specific workload and identifying differentiated access to CPU cycles for those types of threads to yield the greatest average IOPS.

In accordance with some implementations, a method comprises: identifying a permutation of thread type differentiated access to central processing unit (CPU) cycles that yields greatest average input-output operations per second (IOPS) for a storage system processor servicing a run workload; and configuring a thread scheduler for the processor with the identified permutation of differentiated access to CPU cycles.

In accordance with some implementations, an apparatus comprises: a storage system comprising a thread group scheduling optimizer configured to identify a permutation of thread type differentiated access to central processing unit (CPU) cycles that yields greatest average input-output operations per second (IOPS) for a storage system processor servicing a run workload and configure a thread scheduler for the processor with the identified permutation of differentiated access to CPU cycles.

In accordance with some implementations, a non-transitory computer-readable storage medium stores instructions that when executed by a computer perform a method comprising: identifying a permutation of thread type differentiated access to central processing unit (CPU) cycles that yields greatest average input-output operations per second (IOPS) for a storage system processor servicing a run workload; and configuring a thread scheduler for the processor with the identified permutation of differentiated access to CPU cycles.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media or differentiate between hard disk drives (HDDs) and solid-state drives (SSDs). The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
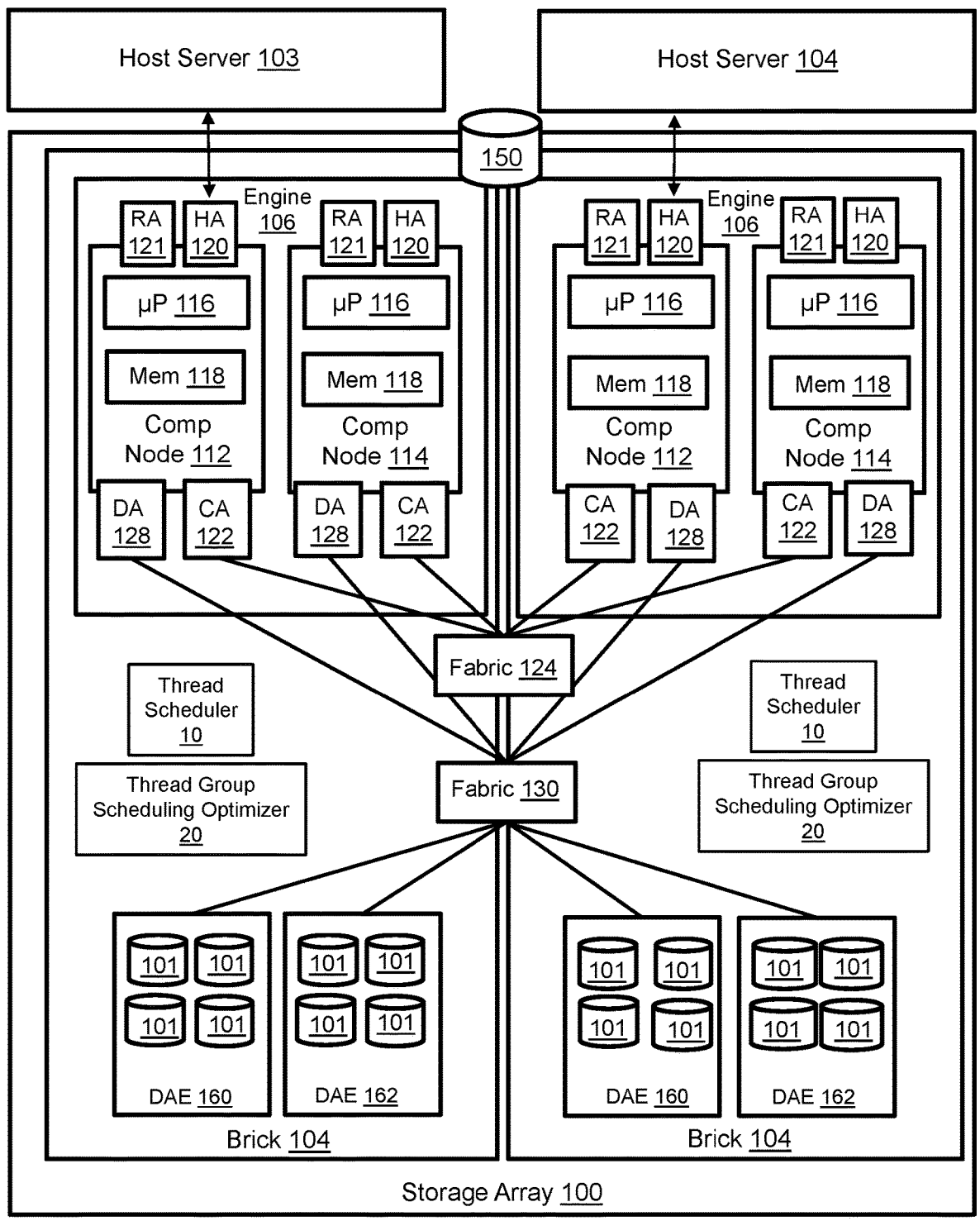
FIG. 1 illustrates a storage array with thread group scheduling optimizers that configure thread schedulers to provide differentiated access to CPU cycles to selected threads in accordance with a prioritization technique.

FIG. 1 illustrates a storage array 100 with thread group scheduling optimizers 20 that configure thread schedulers 10 to provide selected threads with differentiated access to CPU cycles in accordance with a prioritization technique. The thread group scheduling optimizers 20 may independently calculate per-thread-type weighted CPU cycle access for each processor 116 based on one or more run workloads that are representative of the workloads that the processor has processed or is expected to process. As will be explained below, threads are provided with differentiated access to CPU cycles in order to improve or maximize IOPS. Instances of the thread schedulers and thread group scheduling optimizers may be implemented for each compute node or processor, and thread scheduler configurations for different processors within the storage array may differ from each other.

The storage array 100 is depicted in a simplified data center environment with two host servers 103, 104 that run host applications. However, the cluster would typically include more than two host servers. The host servers 103, 104 may include volatile memory, non-volatile storage, and one or more tangible processors that support instances of a host application, as is known in the art. The storage array 100 includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts 103, 104 from the compute nodes 112, 114. Nevertheless, the host applications could run on the compute nodes, e.g., on virtual machines or in containers. Each compute node is implemented as a separate printed circuit board (PCB) or blade that includes hardware resources such as local memory 118 and one or more processors 116. The processor, which may be referred to as a central processing unit (CPU), includes multiple cores. The local memory 118 may include volatile media such as dynamic random-access memory (DRAM), non-volatile memory (NVM) such as storage class memory (SCM), or both. Each compute node allocates a portion of its local memory to a shared memory that can be accessed by all other compute nodes of the storage array using direct memory access (DMA). Each compute node includes one or more host adapters (HAs) 120 for communicating with the host servers 103, 104. Each host adapter has resources for servicing IOs from the host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets for replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

The managed drives 101 are not discoverable by the host servers 103, 104 but an associated storage object 150 is discoverable by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers 103, 104, each production storage object is a single disk having a set of contiguous logical block addresses (LBAs) on which data used by the instances of a host application resides. However, the host application data is stored at non-contiguous addresses on various managed drives 101.

The compute nodes 112, 114 maintain metadata that maps between the LBAs of the production storage object and physical addresses on the managed drives 101 in order to process IOs from the host servers 103, 104. In response to receipt of an IO from a host server, a compute node determines whether the designated LBAs are present in the shared memory. If the LBAs are present in the portion of the shared memory that is local to the compute node that received the IO (i.e., on the same PCB), then the compute node uses the data in the local portion of shared memory to process the IO. More specifically, data copied from the local portion of the shared memory is sent to the host in the case of a read, whereas data is written to the local portion of shared memory in the case of a write. If the LBAs are not present in the local portion of shared memory but are present in a non-local portion of the shared memory, then the compute node uses a DMA operation to obtain the data from the non-local shared memory in the case of a read, whereas the compute node uses a DMA operation to write the data to non-local shared memory in the case of a write. If the LBAs are not present in the shared memory, a situation known as a "cache miss," then the compute node accesses the managed drives to copy the data into shared memory in the case of a read or destage data in the case of a write. These and other functions that contribute to IO processing latency are performed by different, specialized types of threads running on the CPUs. For example, each CPU core has one high-level execution thread that manages IO processing, multiple receiver threads that handle back-end reads by copying data from the managed drives into DRAM, multiple transport threads that manage front-end communications with the host servers, multiple DMA data receiver threads that read data from non-local portions of the shared memory, multiple DMA data transmit threads that send data to non-local portions of the shared memory, and a wide variety of other types of threads that perform a wide variety of tasks related to IO processing. Each thread is a sequence of instructions that is executed by the CPU when dictated by the thread scheduler. The thread scheduler also provides dedicated CPU cycles to individual threads, the order of or access to which is influenced by a thread's relative priority. Threads that perform tasks unrelated to IO processing are not considered by the thread group schedule optimizers.

The importance of different types of threads varies based on factors including the IO workload. For example, thread types that support read operations are more important for servicing workloads that are dominated by reads, whereas thread types that support write operations are more important for servicing workloads that are dominated by writes. The importance of transport threads increases in proportion to the size of IOs. IO workloads may differ between compute nodes so the relative importance of a given thread type may vary from processor to processor within a storage array. It has long been standard practice to provide all thread types with equal, undifferentiated access to CPU cycles. As will be explained below, access to CPU cycles can be provided in a differentiated manner that is calculated to improve performance of individual processors, and thus the storage array, in terms of IOPS by favoring more important types of threads that have a greater influence on IPOS.

Figure 2:
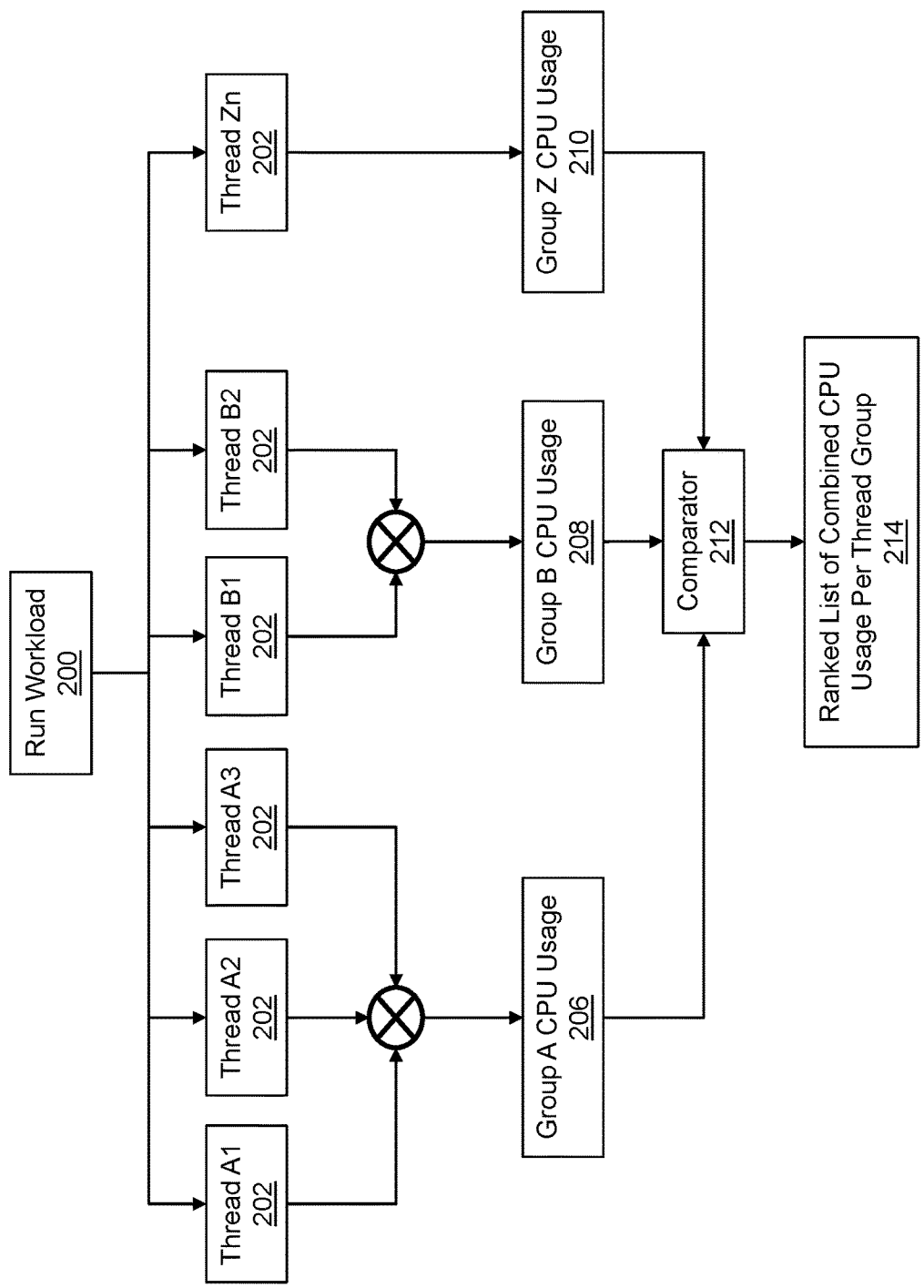
FIG. 2 illustrates thread grouping and thread group ranking.

FIG. 2 illustrates thread grouping and thread group ranking for a selected processor. Threads 202 that perform the same task are organized as a group. The group does not include any threads that do not perform that task. For example, threads 1-3 in group A might be execution threads running on cores of the same processor, and threads 1-2 in group B might be receiver threads that handle back-end reads. The threads are analyzed while servicing a run workload 200 that is representative of the workloads that the processor has processed or is expected to process. In other words, the run workload is not a single generic workload for all processors and all storage arrays, but rather a workload with characteristics to which the specific thread scheduler for a processor will be optimized. Consequently, different run workloads may be used for different processors and different storage arrays. The CPU cycles used by the threads are counted and the CPU cycle counts per thread type group are summed to yield group CPU usage counts 206, 208, 210. The group CPU usage counts are provided to a comparator 212 that generates a ranked list (or other data structure) of combined CPU usage per thread group 214. In other words, the thread groups are ranked in order based on the relative numbers of CPU cycles utilized to service the run workload 200. The relative number of CPU cycles utilized to service the run workload is indicative of the importance of the thread type relative to other thread types, as will be explained below.

Figure 3:
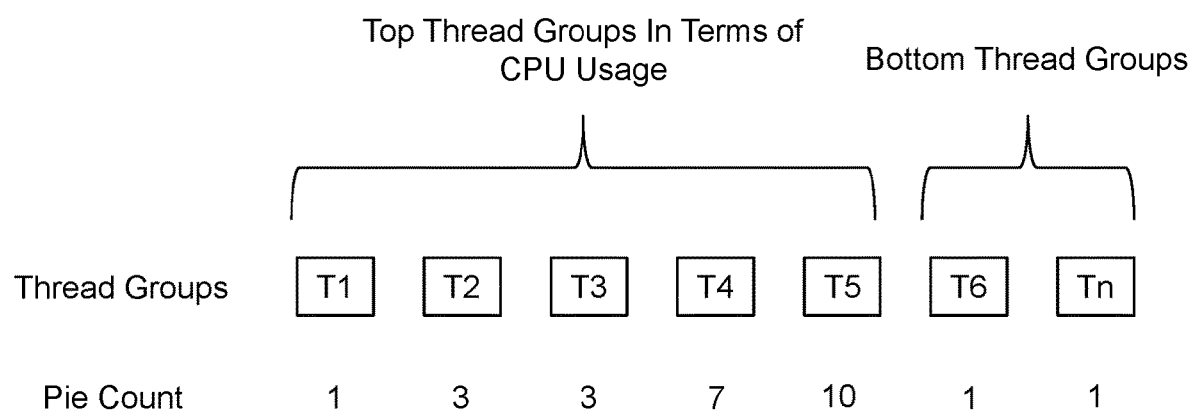
FIG. 3 illustrates a permutation of differentiated CPU cycle access.

FIG. 3 illustrates a permutation of differentiated CPU cycle access. In each permutation, only the most important (top ranked) threads are provided with differentiated access to CPU cycles. The top ranked thread groups are the groups that utilized the most CPU cycles to service the run workload. All other thread groups are characterized as bottom thread groups. Classification of thread groups as either top thread groups or bottom thread groups may be accomplished using a wide variety of statistical techniques based on relative numbers of CPU cycles utilized or simply by selecting the top T thread groups in terms of CPU cycles used, where T is a predetermined integer. In the illustrated example, the top five thread groups are selected (T=5).

Differentiated CPU cycle access is quantified by pie counts that are assigned to the thread groups in each of a plurality of permutations. Pie count is a modifiable attribute given to individual threads to indicate to the thread scheduler the relative share of total computation time that the thread may use in terms of CPU cycles. The pie count can be any integer value from 1 to 31, with 1 being the lowest share and 31 being the highest. For example, a first thread with a pie count of 3 is allowed three times as many CPU cycles during a given period of time as a second thread with a pie count of 1. All threads in the bottom thread groups are assigned a pie count=1 in all permutations. Some threads in the top thread group may be assigned a pie count=1 in some permutations. The threads in the top thread groups are assigned various pie counts in each permutation in accordance with a deterministic algorithm or Fibonacci sequence. In the illustrated example, the threads of the top thread groups are assigned one of only four possible pie counts in a Fibonacci sequence using 1, 3, 7, 10. In the illustrated permutation, all threads in thread group T5 have pie count=10, all threads in thread group T4 have pie count=7, and so forth. Each permutation is characterized by a different allocation of the pie counts to the thread groups. In the illustrated example there are $P(n,r)=n!/(n-r)!=1024$ permutations. In general, different permutations yield different performance in terms of IOPS for a given workload.

Figure 4:
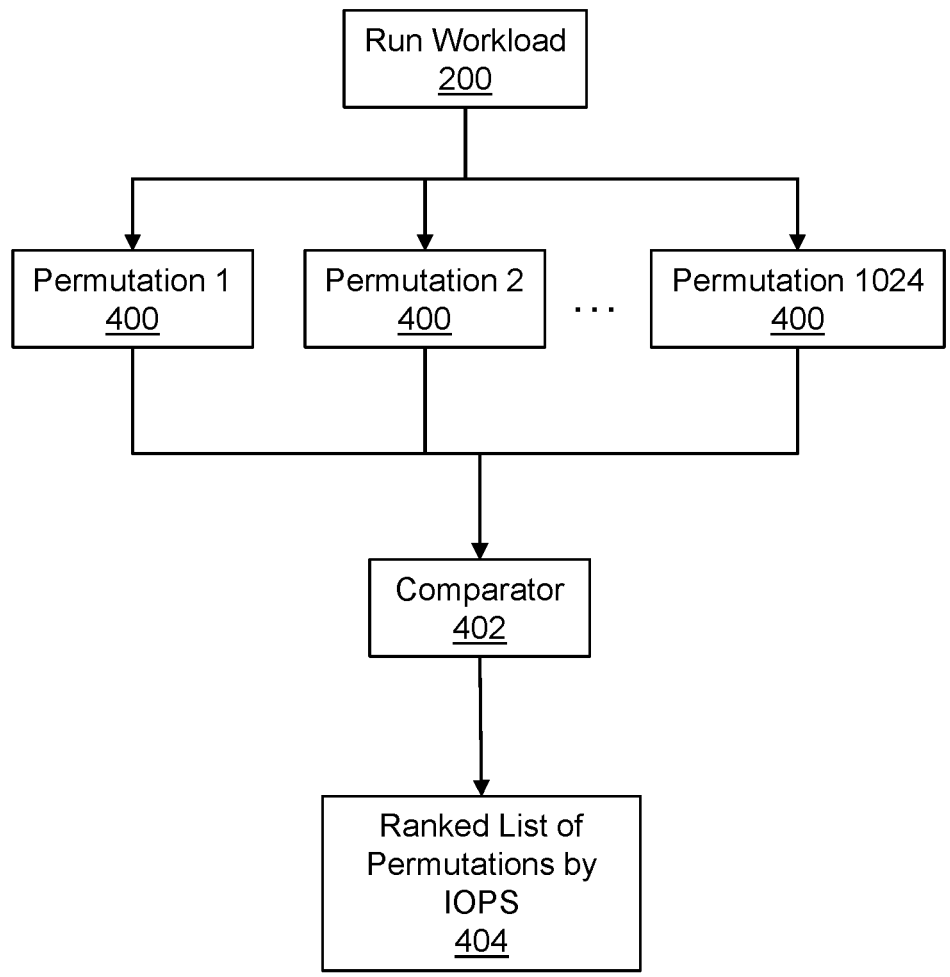
FIG. 4 illustrates ranking of different permutations.

FIG. 4 illustrates ranking of different permutations. The thread group scheduling optimizer calculates pie count assignments for all 1024 permutations 400 and causes the thread scheduler to be configured in accordance with each of those permutations and tested with the run workload 200. In other words, the different permutations are tested, one at a time, in series. For each permutation, the performance of the processor with the same run workload is measured in terms of average IOPS and provided to a comparator 402 that outputs a ranked list 404 of the permutations in order based on average IOPS. Alternatively, the comparator may simply output the permutation that yielded the greatest average IOPS for the processor. The thread group scheduling optimizer reconfigures the thread scheduler with the pie counts of the permutation that yielded the greatest average IOPS for the processor.

Figure 5:
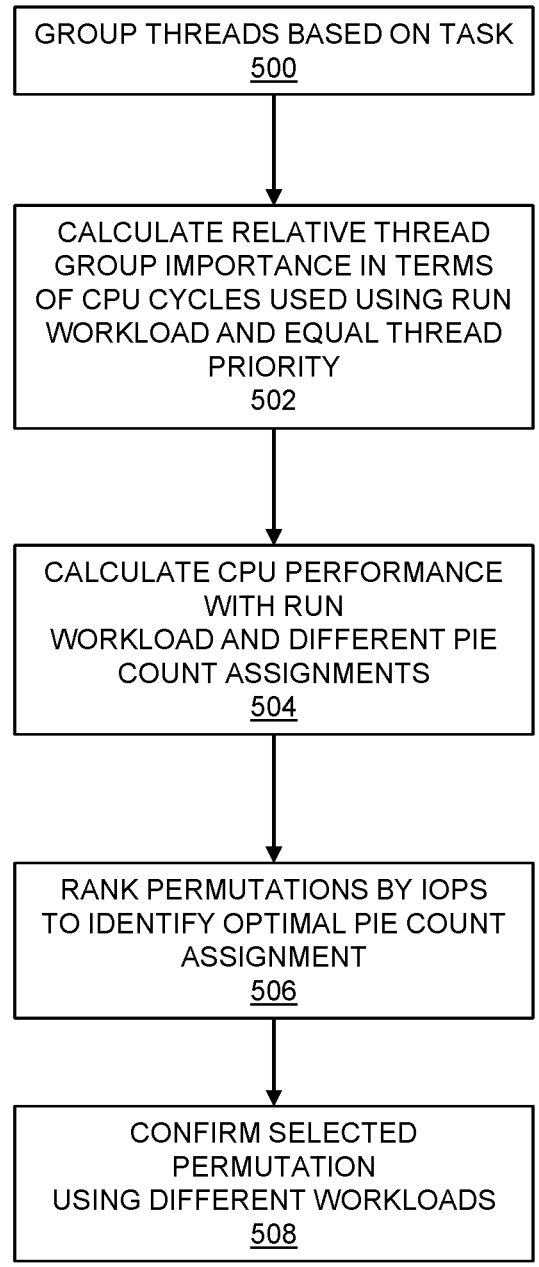
FIG. 5 illustrates operation of the group scheduling optimizers.

FIG. 5 illustrates operation of the group scheduling optimizers. Step 500 is grouping threads based on the tasks that those threads perform. For the selected processor, all threads that perform the same task are assigned to a single group. Threads that do not perform that task are assigned to other groups. Step 502 is calculating relative thread group importance. Thread group importance is determined by the number CPU cycles used by the threads of the thread group to service the run workload, where all threads are assigned equal priority (pie count=1). Step 504 is calculating CPU performance with the same run workload and different pie count assignments to thread types. In order to reduce the number of permutations that are tested, pie counts greater than 1 may be assigned only to the top thread groups in terms of importance. Moreover, a limited set of pie counts may be designated using a Fibonacci sequence. Step 506 is ranking the performance of the different permutations with the run workload in terms of average IOPS. The permutation that yields the greatest average IOPS for the run workload is selected for the processor and the thread scheduler for the processor is reconfigured with the pie counts of that permutation. Step 508 is confirming the selected permutation using different workloads, i.e., different from the run workload. The different workloads may be selected from a range of workloads that the processor may be expected to service.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
in a computer-based data storage system comprising processors that run a plurality of workload-supporting thread types comprising read-supporting threads and write-supporting threads for accessing disk drives to service processor-specific run workloads characterized by different ratios of reads to writes,
identifying, for each processor based on characteristics of a current run workload of that processor, a permutation of a plurality of predefined permutations of thread type differentiated access to central processing unit (CPU) cycles for the read-supporting threads and write-supporting threads that yields greatest average input-output operations per second (IOPS) for that processor for servicing the current run workload, each permutation comprising a record of quantified differentiated CPU cycle allocations to each of a plurality of thread type groups, including:
grouping thread types based on tasks performed by those thread types;
counting CPU cycles used by different types of threads running on the storage system processor to service the run workload and identifying one or more most important thread type groups in terms of CPU cycles used; and
characterizing T thread type groups that used a greatest number of CPU cycles as the most important thread type groups, where T is a predetermined integer value; and
configuring a thread scheduler for each processor with the respective identified permutation of differentiated access to CPU cycles, thereby improving performance of the data storage system in terms of IOPS based on current run workload characteristics.

2. The method of claim 1 further comprising assigning greater CPU cycle access to threads of the most important thread type groups than to threads of other thread types.

3. The method of claim 2 further comprising calculating permutations of differentiated CPU cycle access to the threads of the most important thread type groups.

4. The method of claim 3 further comprising measuring average IOPS yielded by each permutation responsive to servicing the run workload to identifying the permutation that yields the greatest average IOPS.

5. A non-transitory computer-readable storage medium that stores instructions that when executed by a computer perform a method comprising:
in a computer-based data storage system comprising processors that run a plurality of workload-supporting thread types comprising read-supporting threads and write-supporting threads for accessing disk drives to service processor-specific run workloads characterized by different ratios of reads to writes,
identifying, for each processor based on characteristics of a current run workload of that processor, a permutation of a plurality of predefined permutations of thread type differentiated access to central processing unit (CPU) cycles for the read-supporting threads and write-supporting threads that yields greatest average input-output operations per second (IOPS) for that processor for servicing the current run workload, each permutation comprising a record of quantified differentiated CPU cycle allocations to each of a plurality of thread type groups, including:
grouping thread types based on tasks performed by those thread types;
counting CPU cycles used by different types of threads running on the storage system processor to service the run workload and identifying one or more most important thread type groups in terms of CPU cycles used; and
characterizing T thread type groups that used a greatest number of CPU cycles as the most important thread type groups, where T is a predetermined integer value; and
configuring a thread scheduler for each processor with the respective identified permutation of differentiated access to CPU cycles, thereby improving performance of the data storage system in terms of IOPS based on current run workload characteristics.

6. The non-transitory computer-readable storage medium of claim 5 in which the method further comprises assigning greater CPU cycle access to threads of the most important thread type groups than to threads of other thread types.

7. The non-transitory computer-readable storage medium of claim 6 in which the method further comprises calculating permutations of differentiated CPU cycle access to the threads of the most important thread type groups.

8. The non-transitory computer-readable storage medium of claim 7 in which the method further comprises measuring average IOPS yielded by each permutation responsive to servicing the run workload to identifying the permutation that yields the greatest average IOPS.

9. An apparatus comprising:
a computer-based storage system comprising processors that run a plurality of workload-supporting thread types comprising read-supporting threads and write-supporting threads for accessing disk drives to service processor-specific run workloads characterized by different ratios of reads to writes, and a thread group scheduling optimizer configured to identify, for each processor based on characteristics of a current run workload of that processor, a permutation of a plurality of predefined permutations of thread type differentiated access to central processing unit (CPU) cycles for the read-supporting threads and write-supporting threads that yields greatest average input-output operations per second (IOPS) for that processor for servicing the current run workload, each permutation comprising a record of quantified differentiated CPU cycle allocations to each of a plurality of thread type groups, including the thread group scheduling optimizer being configured to group thread types based on tasks performed by those thread types, count CPU cycles used by different types of threads of the storage system processor to service the run workload and identify most important thread type groups in terms of CPU cycles used, and characterize T thread type groups that used a greatest number of CPU cycles as the most important thread type groups, where T is a predetermined integer value, and configure a thread scheduler for each processor with the respective identified permutation of differentiated access to CPU cycles, thereby improving performance of the data storage system in terms of IOPS based on current run workload characteristics.

10. The apparatus of claim 9 in which the thread group scheduling optimizer is further configured to assign greater CPU cycle access to threads of the most important thread type groups than to threads of other thread types.

11. The apparatus of claim 10 in which the thread group scheduling optimizer is further configured to calculate permutations of differentiated CPU cycle access to the threads of the most important thread type groups and measure average IOPS yielded by each permutation for servicing the run workload to identify the permutation that yields the greatest average IOPS.

\* \* \* \* \*